US 6,649,690 B2

(12) United States Patent
Kraft

(10) Patent No.: US 6,649,690 B2
(45) Date of Patent: Nov. 18, 2003

(54) METHOD FOR PREPARING POLYMERS OF GLYCEROL WITH A SAPONITE CATALYST

(75) Inventor: Axel Kraft, Kleve (DE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/303,509

(22) Filed: Nov. 25, 2002

(65) Prior Publication Data

US 2003/0105274 A1 Jun. 5, 2003

Related U.S. Application Data
(60) Provisional application No. 60/334,663, filed on Nov. 30, 2001.

(51) Int. Cl.$^7$ .................................. C08K 3/34
(52) U.S. Cl. ..................... 524/789; 524/791; 568/619; 568/680; 568/698
(58) Field of Search ................ 524/789, 791; 568/619, 680, 698

(56) References Cited

U.S. PATENT DOCUMENTS

| | | | |
|---|---|---|---|
| 5,635,588 A | 6/1997 | Eshuis et al. | 528/395 |
| 5,659,089 A | 8/1997 | Cai et al. | 568/619 |
| 5,710,350 A | 1/1998 | Jeromin et al. | 568/869 |
| 5,721,305 A | 2/1998 | Eshuis et al. | 524/442 |
| 6,334,947 B1 | 1/2002 | De Boer et al. | 208/111.25 |

FOREIGN PATENT DOCUMENTS

| | | |
|---|---|---|
| EP | 0 569 168 A2 | 11/1993 |
| WO | WO 99/59711 | 11/1999 |

OTHER PUBLICATIONS

Abstract for Japanese Publ. No.: 07–321207.

European Search Report dated, Jan. 14, 2003, for EP 02 07 9737.

Primary Examiner—Samuel A. Acquah
(74) Attorney, Agent, or Firm—Ralph J. Mancini

(57) ABSTRACT

The present invention generally relates to a process polymerizing a feedstock which comprises glycerol or derivatives thereof, said process comprising heating said feedstock, in the presence of at least one synthetic magnesium saponite clay catalyst in the H form, to a temperature at which condensation polymerization takes place, for a time sufficient to produce polymers of glycerol or derivatives thereof.

21 Claims, No Drawings

METHOD FOR PREPARING POLYMERS OF GLYCEROL WITH A SAPONITE CATALYST

This application claims the benefit of Provisional Application Ser. No. 60/334,663, filed on Nov. 30, 2001.

FIELD OF THE INVENTION

The invention relates to a method of polymerizing glycerol using a synthetic or extremely pure clay catalyst of magnesium saponite in the H form to obtain advantages in catalyst life and to synthesize predominantly linear and branched polyglycerol.

BACKGROUND OF THE INVENTION

Polyglycerol has many uses, for example, for foaming, as a food emulsifier, as a humectant for cosmetics, as a dispersing agent, as an antistatic agent for plastics, as a surface controller for fibers, as a sizing agent, etc. Linear polyglycerol is preferred because it is more biodegradable and more soluble in water than is cyclic polyglycerol. Basic catalysts can be used to obtain linear polyglycerols, while acid catalysts yield mostly the cyclic forms. It is generally difficult to polymerize glycerol using clay catalysts, since the glycerol is usually strongly absorbed by the catalyst so it does not react.

When basic catalysts, such as caustic, potassium hydroxide or sodium hydroxide, or basic clay catalysts, such as hydrotalcite, are used to polymerize glycerol, the yield is predominantly linear at both lower and higher conversions of glycerol. The primary drawback of the basic catalysts is that they are primarily homogenous, which means that they are in the same phase as the reactants and products. If they are not homogenous, for example, like hydrotalcite, they are in powder form and very difficult to separate from the product mix. As a result, it is difficult to separate the catalyst from the reaction products and the catalyst cannot be easily re-used.

WO 94/21582 to Henkel exemplifies the problems with basic catalysts. It uses sodium hydroxide in a homogenous continuous process of polymerizing glycerol. To separate the catalyst out a distillation procedure is required. It also discloses a zeolite heterogeneous catalyst using a fixed bed at 240° C., but provides no details on catalyst life or polyglycerol yield.

Basic clay catalysts are not homogenous. They are heterogeneous because they are in a different phase from the reactants/products. However, the powdery consistency of these catalysts also makes it difficult to recover them following the reaction. This is especially true when the catalyst is used to polymerize glycerol. Adding a basic clay catalyst to glycerol is the same as adding powder (clay) to honey (glycerol), which results in the formation of a slurry. It is an understatement to say that it is difficult to separate the powdery clay catalyst from the honey-like glycerol. It can be separated, albeit expensively, by distilling under vacuum.

Eshuis WO 95/16723 is an example of an anionic basic clay catalyst. It discloses using hydrotalcite as a slurry catalyst for the polymerization of glycerol.

Acid catalysts are primarily heterogeneous catalysts, meaning that the catalyst is in a different phase from the reactants/products. The advantage of using an acid catalyst is that it can be supported for use in a continuous fixed bed reactor, which permits easy separation and re-use of the catalyst. Unfortunately, when acid catalysts, such as zeolite are used to polymerize glycerol, the reaction yields predominantly cyclic compounds at lower conversions. Zeolite catalysts, for example, are known to yield mostly cyclic polyglycerol. See, for example, WO 94/18259. Additionally, polymerization of glycerol with acid catalysts usually yields a brownish product with a burnt smell.

Purely natural acid clay catalysts, such as that disclosed in JP 95321207, have additional problems. The catalyst in JP 95321207 is a layered silicate, such as saponite, with three different acidity zones which is made by subjecting saponite to acid treatment. It is used for manufacturing polyglycerine.

The acid treatment results in leaching the catalyst, so that it is unknown how much catalyst is left or what it comprises. Acid treatment leaches out anions, magnesium, etc. The catalyst structure resulting from the treatment varies and cannot be predicted. Further, because the clay is a purely natural material, it includes different types of clays, including different types of smectite family clay. As a result, the composition of the catalyst is variable and unknown. Still further, because the purely natural clay starts out as a solid, it cannot be precipitated on to a support for use in a fixed bed reactor. The solid or powder form of the clay can, nevertheless, be used in a fixed bed reactor, but then it is difficult to handle.

SUMMARY OF THE INVENTION

The present invention relates to the use of a synthetic or extremely pure clay catalyst of magnesium saponite in the H form to polymerize glycerol. It has a surprisingly long catalyst life and yields more linear oligomers than expected with typical clay catalysts in the acid form, such as bentonite.

DETAILED DESCRIPTION OF THE INVENTION

According to the invention, a special catalyst is used to polymerize glycerol or derivatives thereof. Glycerol derivatives, such as glycidol, glycerol carbonate, etc. form glycerol on the addition of water and can be polymerized using the catalyst in accordance with the invention. The catalyst has a long catalytic life and when the catalyst is used to polymerize glycerol, the product yield is predominantly linear and branched at lower conversions. This is entirely unexpected, since acid catalysts normally yield mostly cyclic oligomers when polymerizing glycerol.

The catalyst is synthetic so that its structure and properties are uniform from batch to batch and it functions in a predictable manner. The synthetic portion of the catalyst has a specific acidity and a specific structure. The catalyst is referred to herein as a synthetic clay of magnesium saponite in the H form. Generally, $Na^+$ is replaced by $H^+$ by $NH_4^+$ ion exchange in the preparation of the catalyst employed in the present invention. When saponite is exchanged with ammonium ions, zero sodium is targeted and "H-form" is a measure of the amount of sodium exchanged. Advantageously, when the catalyst is used to polymerize glycerol, the product is clearer and has less of a burnt smell, as compared with the polyglycerol produced by other acidic catalysts.

Magnesium saponite in the H form is a layered alumina silicate wherein substitution of silicon atoms by aluminum generates a negative charge in the tetrahedral sheet, which is compensated by the cations, normally sodium ions. The catalyst has a special double layer sheet structure comprised of clay platelets arranged like a house of cards. This arrangement facilitates the transport of large molecules into the clay structure. As a result of the open structure of the catalyst, liquid reactants and products readily diffuse through the catalyst.

Saponite clay is a smectite, with a 2:1 trioctahedral interlayer structure. Without wishing to be bound by a particular theory or general formula, it is believed that the composition of saponites can be exemplified by the following theoretical formula:

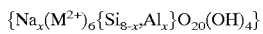
$$\{Na_x(M^{2+})_6\{Si_{8-x}Al_x\}O_{20}(OH)_4\}$$

wherein Mg is the $M^{2+}$ species and x is an integer of from greater than zero up to about 1.25. In another embodiment, x is from about 0.75 to about 1.25.

The magnesium saponite clay catalyst of the invention is made acidic by ion exchange with ammonium ions and is not acid treated like other natural clays since this procedure leads to undefined losses of framework magnesium. A discussion of this ion exchange method can be found in WO 96/07477 which is incorporated herein by reference.

In the catalyst, it is preferred that the ratio of silica to alumina be between about 4 and about 40. In another embodiment, the silica/alumina ratio is between about 10 and 30. In still another embodiment, the silica/alumina ratio is between about 11 and 20.

The catalyst used in the inventive method can be in the form of a solid/powder or it can be supported. When the catalyst is in the solid/powder form, the reaction preferably takes place in a batch reactor so that water is periodically removed to increase the yield of polyglycerol. The catalyst is used in the form of a slurry.

When the synthetic clay of magnesium saponite in the H form is used in a fixed bed operation, catalyst loss is prevented. Catalyst is usually lost in a stirred tank reactor, such as that used with a natural clay catalyst, due to abrasion of the fragile saponite material.

The synthetic catalyst can be used in a fixed bed reactor in a solid/powder form, or precipitated onto a solid support, or combined with a binder, such as alumina, and shaped in a known manner, e.g., by extrusion. Worm-like extrudates are preferred, though ring-like extrudates can also be used.

When the catalyst is supported, preferably it is supported on a bed of alumina or silica. Various methods of supporting the catalyst on a support are known to the skilled artisan. For example, a saponite powder or cake can be mixed with a support material, i.e., for example, alumina, silica, silica-alumina, silica-boria, zirconia and the like, followed by extruding or beading the final mixture. When the catalyst is supported, it allows for fixed bed operation in a continuous process. Surprisingly, the catalyst is still effective after 5 days of continuous operation.

Whereas water produced as by-product in the condensation reaction is typically removed in a stirred tank reactor during the condensation, water has to be removed in a fixed bed reactor after the condensation has proceeded to a certain point. The reaction takes place significantly above the boiling point of water (230–260° C., preferably 245–255° C.), but below the boiling point of glycerol (290° C.) and below the boiling point of all other oligo- and polyglycerols (which is higher than glycerol). If desired, moderate vacuum may be applied to facilitate the separation of water.

A continuous process will polymerize, or convert, 10–15 wt % of the glycerol. This yield is predominantly linear when using the catalyst in accordance with the invention. It is also surprising that the magnesium saponite used in the invention shows minimal activity loss and very little physical or structural breakdown after being used continuously over a period of five days in a fixed bed reactor fed with pure glycerol. Moreover, it has been found that the oligoglycerol produced by one of the aforementioned processes can be further reacted with acids, preferably fatty acids, to yield polyglycerol esters with or without the presence of a magnesium saponite catalyst.

The catalyst can be used to polymerize glycerol in a reactor equipped with a membrane, such as that disclosed in, WO 99/59711, which is incorporated herein by reference. The polymerization of glycerol is a condensation reaction. Such reactions are equilibrium reactions in which yield is increased by removing by-products, such as water. To remove the by-products, the reaction mixture is pumped through a conduit to a pervaporation unit which has a membrane to separate the by-product from the reaction mixture, which is returned to the reactor.

The membrane contemplated by WO 99/59711 for use in the pervaporation unit is inorganic and the average pore size of the separating layer is less than 0.5 nm, preferably 0.2 to 0.5 nm. It is a thin layer, less than 0.5 nm, which is provided on the outside of a multilayer porous alumina support. The catalyst can be placed anywhere it will be effective. For example, it can be placed on the membrane which can be inside or outside of the reactor, or both. The catalyst can be placed on a support which can be inside or outside of the reactor, or both. Additionally, the catalyst can be placed on particles in a reactive system, such as a slurry. Preferably, the membrane is tubular, but it can be flat. The inorganic membrane can be a ceramic membrane based on zeolites, carbon molecular sieves and amorphous material, such as silica, preferably microporous amorphous silica.

In one example of polymerizing glycerol in WO 99/59711, the reactor was heated to 250° C. and the glycerol was circulated over the membrane and a heterogeneous acid catalyst in a packed bed. The pressure was below 2 bar in the reactor and at the outside of the membrane. Water was continuously removed during the reaction and the water content of the permeate was over 99.8%. In accordance with the present invention, the catalyst used together with the membrane in the polymerization of glycerol is a synthetic clay catalyst of magnesium saponite in the H form.

The amount of the catalyst used should be optimized depending on the desired results. In a batch process the amount can be, for example, 0.1–10, 1.1–5, or 2–3% by weight based on the weight of glycerol. When the catalyst is used in a continuous mode, the amount can be, for example, 50 g catalyst per 0.1–5 ml/min glycerol, and can be 50 g catalyst per 1–2 ml/min glycerol.

Preparation of the Catalyst

To prepare the catalyst of the invention, 67 grams of demineralized water was added to 26.6 grams of waterglass (about 27% silica) in a 250 ml beaker. To this was added, after vigorous stirring, a solution of 7.93 grams of aluminum nitrate 9-hydroxide in 53 grams of NaOH (2 mol/l). This reaction mixture was then diluted down with 670 ml $H_2O$. The solution was then heated to 90° C. for 30 minutes. After thirty minutes, a second solution of 27.11 grams of magnesium nitrate 6-hydrate, 24.02 grams urea and 333 grams water is added and the pH measured. The reaction is kept 20 hours under these conditions. After 20 hours, the pH is again measured and the reaction mixture is filtered. The filtercake is washed three times with hot demineralized water and dried in an oven overnight at 125° C. The first reaction progresses smoothly, but the second proceeds more slowly. The reaction is buffered at around pH 7 and the formation of the magnesium saponite clay catalyst occurs at a pH range of from 5 to about 8.

The synthetic or extremely pure magnesium saponite is transformed into the H form by ion exchange. Preferably, prior to use as a catalyst, it is pre-treated with a calcining procedure. In the absence of such a procedure, in situ calcination results during the polymerization reaction. The pre-treatment calcining takes place at, for example, 100–550° C., 300–500° C., 240–250° C. for about 15 minutes to 5 hours, preferably 1–3 hours. These techniques are known to persons of ordinary skill in the art. Additional saponite catalysts having utility in the method of the present invention can be found in WO 00/00286 which is incorporated herein by reference.

EXAMPLE 1

In this example, glycerol was polymerized in a batch process. The reaction took place in a 2 liter glass reactor at 250° C. with 1.38 kg glycerol and 35 g (2.5 wt %) of the magnesium saponite catalyst. The catalyst was in the form of a crushed filtercake having a particle size of from about 0.8 to about 2 mm. Prior to use it was calcined for 1 hour at 300° C. The results of this example, as determined by HPLC analysis, are shown in FIG. 1 and in Table 1, below. As shown, at lower conversions glycerol is polymerized to predominantly linear diglycerol. In fact, at conversions below about 25%, the yield does not include any cyclics. The "other oligomers" include other linear polyglycerol (besides diglycerol), as well as branched and cyclic polyglycerol.

TABLE 1

| time [h] | % glycerol | % diglyc. lin. | % other oligomers |
|---|---|---|---|
| 0 | 100 | 0 | 0 |
| 24 | 76 | 17 | 7 |
| 32 | 59 | 27 | 14 |
| 40 | 44 | 30 | 26 |
| 48 | 27 | 27 | 46 |

Examples 2–5 use a synthetic clay catalyst of magnesium saponite in the H form to polymerize glycerol. These examples employed a one pass through fixed bed reactor with an HPLC pump and temperature and pressure regulators for the polymerization reaction. The tubular reactor had an inner diameter of 2 mm, and the catalyst was inside the reactor. The catalyst was calcined for one hour at 500° C. prior to use in the polymerization reaction. A total of 50 g of the catalyst was used in each example. The catalyst was supported on alumina.

EXAMPLE 2

The conditions of the reaction were as follows: the temperature was 250° C., the residence time in the reactor was 120 min., the pressure was 2 bars, and the glycerin flow was 0.5 ml/min. A sample was taken after 48 hours. The sample was 78% unconverted glycerin and 6.2% linear diglycerin.

EXAMPLE 3

The conditions of the reaction were the same as in Example 2. A sample was taken after 96 hours. The sample was 75.5% unconverted glycerin and 6.8% linear linear diglycerin.

EXAMPLE 4

The conditions of the reaction were as follows: the temperature was 240° C., the residence time in the reactor was 240 min., the pressure was 2 bars, and the glycerin flow was 0.25 ml/min. A sample was taken after 45 hours. The sample was 66.95% unconverted glycerin, 7.08% linear diglycerin and 0.65% linear triglycerin, as determined by HPLC analysis.

EXAMPLE 5

The conditions of the reaction were the same as in Example 4. A sample was taken after 93 hours. The sample was 69.24% unconverted glycerin, 7.43% linear diglycerin and 0.52% linear triglycerin, as determined by HPLC analysis.

Diglycerin is segregated in the examples because it is a preferred linear polyglycerin. The yields included other types of linear polyglycerin which were not separately recorded.

What is claimed is:

1. A process polymerizing a feedstock which comprises glycerol or derivatives thereof, said process comprising heating said feedstock, in the presence of at least one synthetic magnesium saponite clay catalyst in the H form, to a temperature at which condensation polymerization takes place, for a time sufficient to produce polymers of glycerol or derivatives thereof.

2. The process of claim 1 wherein glycerol is heated to a temperature of from 190° C. to 260°.

3. The process of claim 2 wherein glycerol is heated to a temperature of from 245° C. to 255°.

4. The process of claim 1 wherein 0.1 to 10% by weight of catalyst is employed, based on the weight of glycerol.

5. The process of claim 4 wherein 1 to 5% by weight of catalyst is employed, based on the weight of glycerol.

6. The process of claim 1 wherein said feedstock comprises glycerol, glycidol, glycerol carbonate or mixtures thereof.

7. The process of claim 1 wherein the Si:Al ratio of said clay catalyst is between 4 and 40.

8. The process of claim 7 wherein the Si:Al ratio of said clay catalyst is between 8 and 30.

9. The process of claim 8 wherein the Si:Al ratio of said clay catalyst is between 10 and 15.

10. The process of claim 1 wherein the reaction is conducted under a blanket of inert gas.

11. The process of claim 10 wherein said inert gas comprises nitrogen.

12. The process of claim 1 wherein at least part of the by-products formed during the reaction are removed in order to increase product yields.

13. The process of claim 1 wherein a batch reactor is employed.

14. The process of claim 1 wherein said process is a continuous operation.

15. The process of claim 14 wherein at least part of the by-products formed during the reaction are removed in order to increase product yields, wherein said removal is facilitated by the aid of a membrane.

16. The process of claim 15 wherein said membrane is a ceramic membrane with an average pore size of from 0.1 to 0.5 nm having an affinity towards the components to be extracted.

17. The process of claim 15 wherein the surface of the membrane is catalytically active.

18. The process of claim 16 wherein said membrane comprises microporous amorphous silica.

19. The process of claim 1 wherein said catalyst is precipitated onto a solid support, pressed with a binder or extruded.

20. The process of claim 1 wherein said catalyst is supported on a bed of alumina, silica or mixtures thereof.

21. The process of claim 1 wherein said polymers of glycerol or derivatives thereof are predominantly linear and/or branched.

* * * * *